United States Patent [19]

Nelson

[11] Patent Number: 4,497,586
[45] Date of Patent: Feb. 5, 1985

[54] CELSIUS ELECTRONIC THERMOMETER CIRCUIT

[75] Inventor: Carl T. Nelson, San Jose, Calif.

[73] Assignee: National Semiconductor Corporation, Santa Clara, Calif.

[21] Appl. No.: 379,203

[22] Filed: May 17, 1982

[51] Int. Cl.³ .............................................. G01K 7/00
[52] U.S. Cl. .................................... 374/163; 374/178
[58] Field of Search .............. 374/163, 173, 178, 183, 374/185, 169, 172; 307/310, 308; 364/557, 571

[56] References Cited

U.S. PATENT DOCUMENTS

| | | | |
|---|---|---|---|
| 3,809,929 | 5/1974 | Vittoz | 374/178 |
| 4,004,462 | 1/1977 | Dobkin | 374/173 |
| 4,063,116 | 12/1977 | Schmoock | 307/310 |
| 4,071,813 | 1/1978 | Dobkin | 374/178 |
| 4,207,481 | 6/1980 | Dobkin | 307/310 |
| 4,284,334 | 8/1981 | Magel | 307/310 |
| 4,348,633 | 9/1982 | Davis | 307/310 |
| 4,350,904 | 9/1982 | Cordell | 307/310 |
| 4,401,898 | 8/1983 | Sommerer | 307/310 |

OTHER PUBLICATIONS

S 7308-0028-Y, "Integrated circuit temperature controller" by Dance, Australian Electronics Engineering, Apr. 1976.

Primary Examiner—Charles Frankfort
Assistant Examiner—David R. Schuster
Attorney, Agent, or Firm—Gail W. Woodward; Paul J. Winters; Michael J. Pollock

[57] ABSTRACT

An electronic Celsius thermometer circuit suitable for fabrication in integrated circuit form has an output directly related to the temperature scale. The zero crossing is created by subtracting a negative-temperature-coefficient voltage from a positive-temperature-coefficient voltage with one of the voltages being made adjustable and set to equal the other. The output response is set to provide the desired temperature scale. If desired the zero crossing and temperature scale can be set for Fahrenheit readings as well as for Celsius. A circuit improvement is also disclosed for compensating the thermometer for departures from linearity.

10 Claims, 6 Drawing Figures

U.S. Patent  Feb. 5, 1985  Sheet 1 of 2  4,497,586
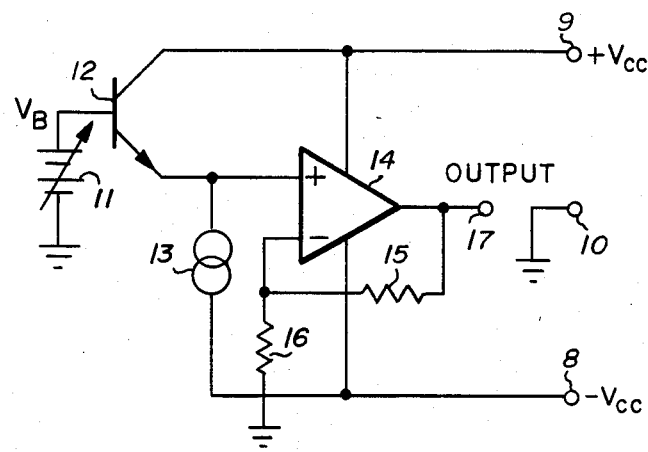
Fig_1 (PRIOR ART)
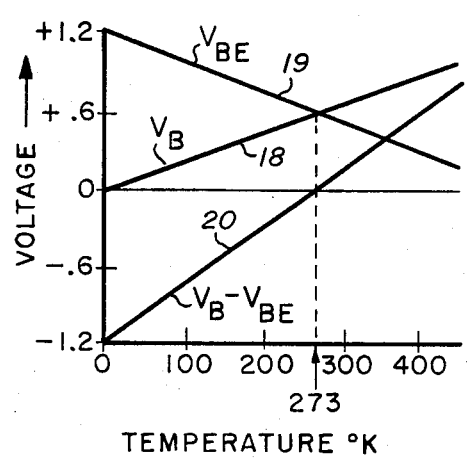
Fig_2 (PRIOR ART)
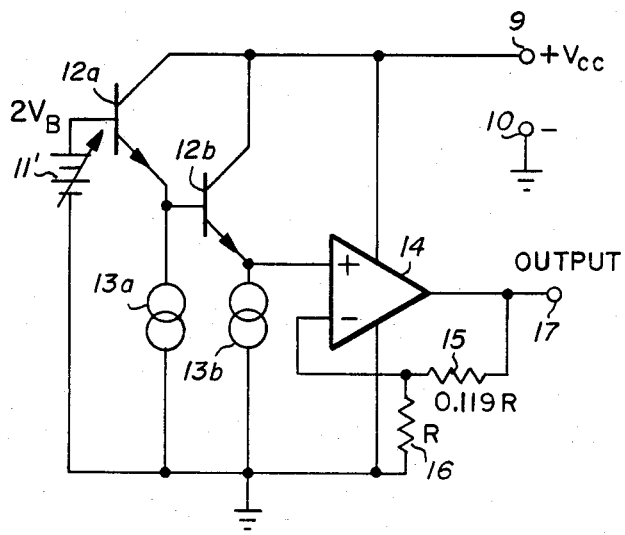
Fig_3
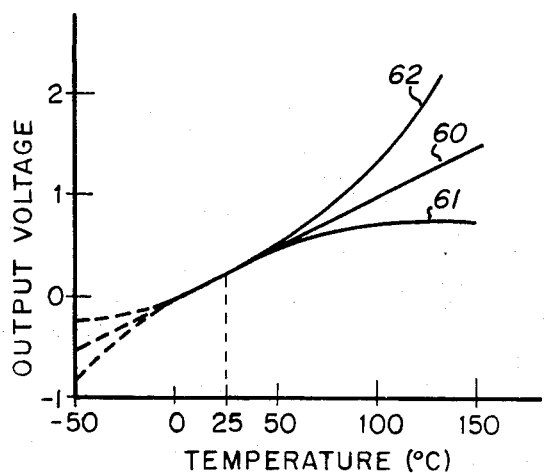
Fig_6

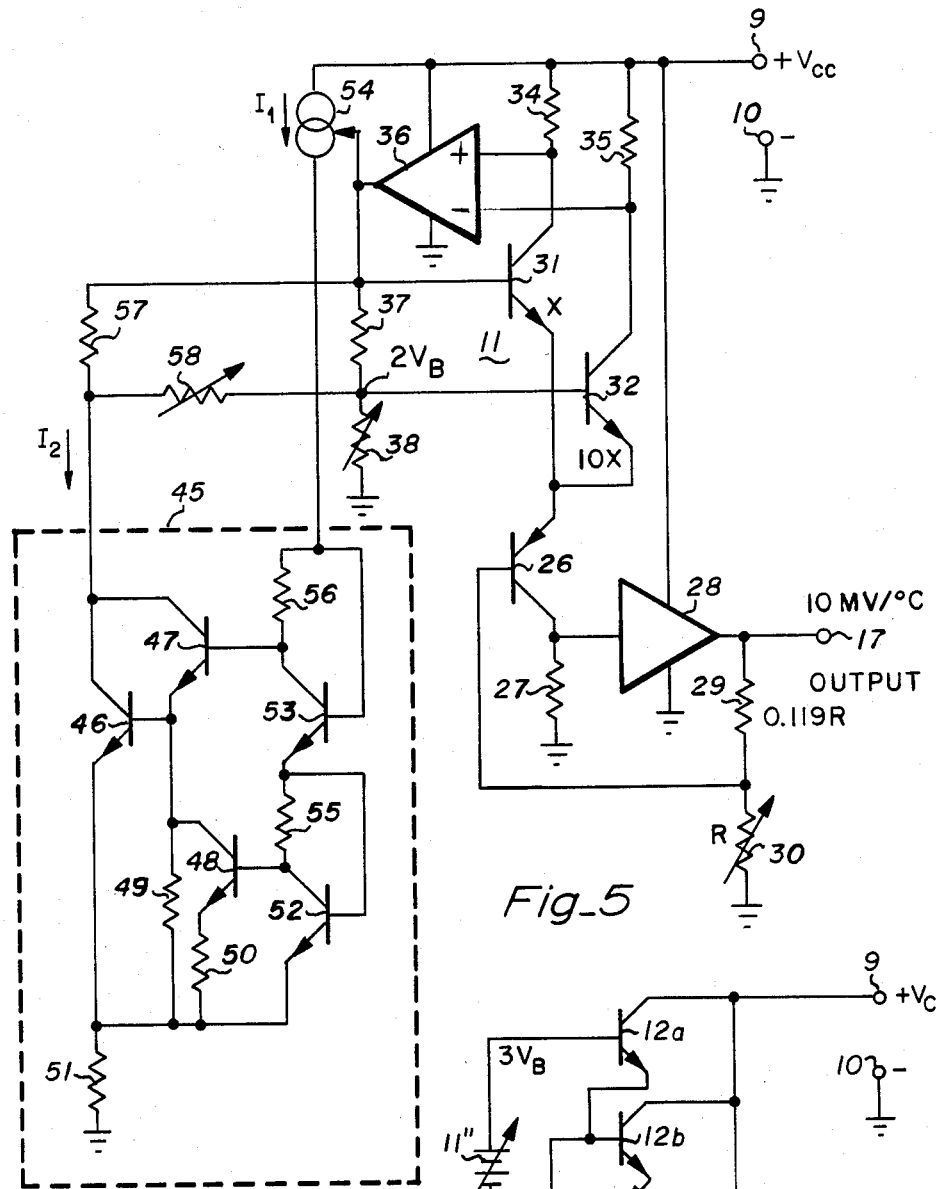
Fig_5
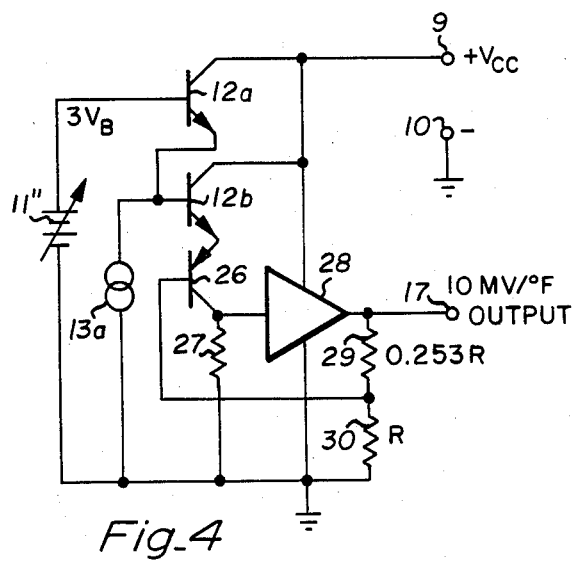
Fig_4

4,497,586

CELSIUS ELECTRONIC THERMOMETER CIRCUIT

BACKGROUND OF THE INVENTION

U.S. Pat. No. 4,004,462 to Robert C. Dobkin is assigned to the assignee of the present invention and is titled TEMPERATURE TRANSDUCER. This patent describes an integrated circuit in which a voltage is developed that is linear and directly proportional to absolute temperature (PTAT) and which extrapolates to zero at absolute zero. The characteristic is developed as a fundamental property of the differential in base to emitter voltage in a pair of transistors operated at different current densities. The nature of the device means that only one calibration point is needed to make it accurate over its entire range.

Commercially the LM135/LM235/LM335 Precision Temperature Sensor Family is available from National Semiconductor Corporation. These devices when biased from a nominal source of current develop a 10 mv/°K voltage response, operate over the range of −55° C. to +150° C., and when calibrated at 25° C. have less than 1° C. error over a 100° C. range. To obtain a Fahrenheit or Celsius scale reading the output of a sensor is combined with the output of a precision temperature-stable voltage that is designed to be equal to the temperature sensor voltage at the temperature scale's zero point. This is an undesirable approach because it requires a sensor along with a number of other stable, low-drift external components.

It is well recognized that a single IC chip could be provided with the circuits necessary to develop both a temperature-related voltage and a temperature-stable precision reference voltage. However, this would require a very complex IC design.

In the IEEE Journal of Solid-State Circuits for June, 1980, a paper titled "An IC Temperature Transducer with an Intrinsic Reference" by Gerard C. M. Meijer appears on pages 370-373. The approach is to develop a PTAT voltage and to subtract therefrom a voltage having a negative temperature coefficient, such as the base-to-emitter voltage of a conducting transistor. If the two voltages are made equal at zero Celsius, the result is a voltage that is proportional to the Celsius temperature scale. An amplifier that responds to the difference voltage can then be used to create a Celsius thermometer having a scale factor that is determined by amplifier gain.

SUMMARY OF THE INVENTION

It is an object of the invention to provide a circuit in which a voltage that has a positive temperature coefficient is subtractively combined with a second voltage having a negative temperature coefficient whereby the difference passes through zero at that temperature where the two voltages are equal and the combined voltages are selected to have a temperature coefficient that is close to the desired scale factor, such as 10 mv/°C., so that when the combined voltages are fed to a nearly unity gain amplifier, the output has the desired scale factor.

These and other objects are achieved as follows. A positive temperature coefficient of voltage (PTAT) source is created using a conventional $\Delta V_{BE}$ generator. The base-to-emitter voltage $V_{BE}$, of a pair of conducting transistors, which has a negative temperature coefficient, is subtracted from the $\Delta V_{BE}$ output. The relative magnitudes of the two voltages are selected so that they are equal at either zero Celsius or zero Fahrenheit. The difference is passed through a buffer having close to unity gain that provides a convenient temperature scale at its output. A curvature correction circuit is included to compensate for departure from linearity in the $V_{BE}$ versus temperature response.

BRIEF DESCRIPTION OF THE DRAWING

FIG. 1 is a schematic diagram of the basic circuit of the prior art.

FIG. 2 is graph showing the temperature response of the prior art circuit of FIG. 1.

FIG. 3 is a schematic diagram of the basic circuit embodiment of the invention.

FIG. 4 is a schematic diagram of an alternative circuit embodiment of the invention.

FIG. 5 is a schematic diagram of a circuit including details of a $\Delta V_{BE}$ generator that also functions in accordance with the invention and further includes a curvature compensation circuit.

FIG. 6 is a graph showing the compensation of the circuits of FIG. 4.

DESCRIPTION OF THE INVENTION

FIG. 1 shows the basic elements of the prior art. A dual-polarity power supply is connected to terminals 8-10. Terminal 9 is coupled to a $+V_{CC}$ source and terminal 8 is coupled to a $-V_{CC}$ source. Terminal 10 is the ground reference.

An adjustable voltage source 11 labeled $V_B$ is selected to have a PTAT. This could conveniently be a well known $\Delta V_{BE}$ generator which has an output that rises with temperature and goes to zero at absolute zero. Thus $V_B$ is of adjustable slope and increases linearly with temperature. This characteristic is shown as curve 18 of the graph in FIG. 2.

$V_B$ source 11 has its positive terminal connected to the base of transistor 12 which has its collector returned to $+V_{CC}$. Current source 13 returns the emitter of transistor 12 to $-V_{CC}$. Thus the $V_{BE}$ of transistor 12 will be that potential required to turn transistor 12 on sufficiently to conduct the current of source 13. The potential at the emitter of transistor 12 will be $V_B - V_{BE12}$. Since the $V_{BE}$ of a conducting transistor has a negative temperature coefficient, shown as curve 19 of FIG. 2, the potential at the emitter of transistor 12 will follow curve 20 of FIG. 2.

Since the slope of curve 18 can be adjusted, the crossover of curves 18 and 19 can be selected for any desired temperature such as zero degrees Celsius or zero degrees Fahrenheit. Curve 20 of FIG. 2 shows a zero Celsius crossover.

Operational amplifier (op amp) 14 has its non-inverting input coupled to the emitter of transistor 12 and a negative feedback attenuator composed of resistors 15 and 16, coupled to its inverting input. Thus the output of op amp 14 will amplify the potential of the emitter of transistor 12. Since the values of resistors 15 and 16 can be employed to set the op amp gain, the potential at terminal 17 can be adjusted to provide a desired temperature scale. One commonly used value is 10 mv/°C.

The circuit of FIG. 1 provides a positive output for temperatures above zero and negative output for temperatures below zero so that a true Celsius thermometer is present. In the event that only above-zero temperatures are to be measured, the circuit of FIG. 1 can be simplified by grounding terminal 8. Here a single power supply is used with one terminal at ground. However current source 13 will typically require a minimum of about 200 mv. to operate. This would limit such a single supply configuration to a 20° C. minimum temperature which would be a distinct disadvantage.

In terms of scale factor, the value of the circuit output $V_{BE}$ at absolute zero ($-273.2°$ C.) extrapolates to $-1.22$ volts, which is the semiconductor band gap, and the circuit output goes to zero at zero Celsius. This means that the potential of the emitter of transistor 12 has a slope of 4.47 mv/°C. Thus if op amp 14 has a gain of 2.237, the output at terminal 17 will be 10 mv/°C. The values of resistors 15 and 16 can be adjusted to give this temperature scale.

For a Fahrenheit thermometer, zero degrees F. occur at 255.4° K. which gives a slope of 4.79 mv/°K. This converts to 2.66 mv/°F. An amplifier gain of 3.76 will give a scale factor of 10 mv/°F.

FIG. 3 shows an improved circuit of a Celsius thermometer in accordance with the invention. Here a variable PTAT source 11' is operated at $2V_B$ and two conducting transistors 12a and 12b are cascaded so that their combined $V_{BE}$ values are subtracted from $2V_B$. Such a combination will give a slope of emitter voltage at transistor 12b of close to 8.94 mv/°C. This means that an op amp 14 gain of only 1.119 is needed to give a 10 mv/°C. output. The value of resistor 15 is made 0.119 times the value of resistor 16. Since the amplifier gain is so close to unity, errors in resistor values are much less significant. For example, a feedback resistor error of 1% in FIG. 3 will produce an output error of about 0.1%.

FIG. 4 shows a Fahreheit embodiment of the invention, along with some circuit performance improvements. Variable PTAT source 11'' produces a voltage of $3V_B$ and the series-connected $V_{BE}$ drops of transistors 12a, 12b, and 26 subtracted therefrom. This potential, after subtraction, appears across resistor 30. Resistor 29 acts with resistor 30 to form a feedback loop to the base of transistor 26. Since amplifier 28 is a noninverting buffer this feedback is negative. The values of resistors 29 and 30 are selected to provide a gain of 1.253 which produces an output of 10 mv/°F. Since the lowest voltage drop that can exist across resistor 30 is the base current of transistor 26, this circuit will operate at a much lower output minimum than that of FIG. 3.

While not shown, the FIG. 3 embodiment can also be converted to a dual-power-supply version as is shown in FIG. 1 so that below-zero temperature can easily be indicated.

FIG. 5 shows an operating circuit embodiment of the invention that also includes a detailed showing of an adjustable $V_B$ generator 11 which could be used for that function in the FIG. 3 embodiment. Transistors 31 and 32 are commonly connected to a current source made up of transistor 26 and resistor 27. These transistors have their current densities ratioed so that the base of transistor 31 must be more positive than the base of transistor 32. Resistors 34 and 35 act as loads for transistor 31 and 32 respectively. If these resistors are made equal, the transistor currents are equal and the current densities are ratioed by using different emitter areas as shown in transistors 31 and 32. Alternatively transistors 31 and 32 can be matched and the current densities ratioed by using different values for resistors 34 and 35. Op amp 36 senses the voltage drop difference across resistors 34 and 35 and drives the voltage divider composed of resistors 37 and 38 until the differential input is of the correct magnitude. With the 10:1 emitter ratio shown, and equal-value load resistors 34 and 35, at about 300° K. the voltage across resistor 37 will be on the order of 60 mv. Since substantially the same current flows in resistors 37 and 38, the value of resistor 38 can be varied to establish substantially any desired value of $V_B$. For example if resistor 38 is made twenty times the value of resistor 37, $V_B$ will be about 1200 mv at 300° K. which is close to $2V_{BE}$. Accordingly, a PTAT voltage, $V_B$, is established across resistor 38 and is adjustable over a wide range. Since $V_B$ extrapolates to zero at absolute zero, it will rise linearly with temperature along a slope determined by geometrical factors.

The $V_B$ developed is applied directly to the base of transistor 32, the emitter of which is coupled to the emitter of transistor 26. The $V_{BE}$ values across transistors 32 and 26 combine to develop a potential that is substracted from $2V_B$ so as to cross zero at zero degrees Celsius (or Fahrenheit if desired). Amplifier 28 along with feedback resistors 29 and 30 set the amplifier gain so that the output at terminal 17 has the desired scale. Using conventional IC components the potential across resistor 30 has a slope of 8.94 mv/°C. To achieve a 10 mv/°C. output slope resistors 29 and 30 are designed to have a 0.119 to one ratio as was described in connection with FIG. 2.

The circuit of FIG. 5 has a low temperature advantage as described above. The lowest voltage that can be sensed at terminal 17 is potential produced by the base current of transistor 26 flowing in resistor 30. This typically limits the practical output to about 0.5° C.

While not shown, it is clear that resistors 34 and 35 could be replaced by a current mirror load having a single-ended output. In this event op amp 36 would be replaced with a single-ended amplifier.

The circuit at 45 is designed to linearize the output response of the thermometer circuit. While FIG. 2 shows an idealized set of curves, in actual practice it has been found that the $V_{BE}$ plot 19 versus temperature is not a straight line but some curvature is present. If a precision wide range thermometer is desired, this curvature should be compensated.

The heart of the compensation circuit 45 is transistor 46 which is Darlington connected to driver transistor 47. The base of transistor 46 is returned to its emitter through resistor 49. The series combination of transistor 48 and resistor 50 is in parallel with resistor 49. Resistor 51 returns the emitter of transistor 46 to ground. However this resistor is not essential to the operation of the circuit and can be replaced by a short circuit.

Transistors 52 and 53 have their base to emitter circuits coupled in series and are returned via source 54 to $+V_{CC}$. The collector of transistor 52 biases transistor 48 and the collector of transistor 53 biases the base of transistor 47. Source 54, which is controlled by the output of op amp 36 as shown, produces $I_1$ which has a PTAT coefficient related to $V_B$. This current flows through transistors 53 and 52. While most of this current flows between the collectors and emitters, a small fraction of the current flows through the base to emitter circuits so that $V_{BE}$ appears between the emitter and base of transistor 52 and $2V_{BE}$ appears at the base of transistor 53 with respect to the emitter of transistor 52. Since the transistor $V_{BE}$ has a negative temperature coefficient, the voltage at the base of transistor 53 will fall with rising temperature. Because of resistor 56 the collector of transistor 53 will tend to track its base but at a slightly lower potential. This difference rises with temperature. Thus as temperature rises and the base of transistor 53 falls, its collector will also fall but at a slightly lower rate.

In terms of transistor 52 the base potential will fall with increasing temperature and, due to resistor 55, its collector will also fall but at a slightly lower rate. The purpose of resistors 56 and 55 is to make the base voltages of transistors 47 and 48 independent of small variations in current source 54. They have a value equal to $KT/q \div I_1$ for resistor 55 and $2 KT/q \div I_1$ for resistor 56. Since the base of transistor 48 is coupled to the collector of transistor 52 it can be seen that the emitter of transistor 48 will rise with temperature because the $V_{BE}$ of transistor 48 will decrease faster than the collector of transistor 52. Thus the current in transistor 48, and therefore resistor 50, will have a positive temperature coefficient or PTAT. Resistor 49 will produce a current related to the $V_{BE}$ of transistor 46 so it will have a negative temperature coefficient. By the proper selection of resistor values the current flowing in transistor 47 can be made substantially constant, independent of temperature.

Transistors 46, 47, 52 and 53 are coupled together with resistors 49, 50, 55, and 56 to produce the relationship:

$$I_{C46} \alpha (I_{C53})^2 / I_{C47}$$

Where IC is collector current in the designated transistor.

Since, as shown above, the current in transistor 53 rises with temperature, and $I_{C47}$ is constant, it can be seen that the current in transistor 46 rises with the square of the absolute temperature $(PTAT)^2$.

From the foregoing it can be seen that $I_2$ is composed of a constant current term, from transistor 47, and a term that increases as the square of the absolute temperature of the $I_C$ chip from transistor 46.

Because resistor 57 is much smaller than resistor 58, $I_2$ flows primarily in resistor 57. It will vary the bias across resistor 37 with the compensation effect of $I_2$ being determined by the value of resistors 57 and 58. As a practical matter the operating current $I_2$ is controlled so that at 25° C. the voltage drop across resistor 57 is equal to the voltage drop across resistor 37. Thus, at room temperature the value of resistor 58 will not affect the $\Delta V_{BE}$ generator 11. The voltage across resistor 58 is=

$$V_{58} = K_1 (T_c - 25)^2$$

Where $T_c$ is the Celsius temperature and $K_1$ is a constant. This shows that the voltage across resistor 58 is a pure quadratic term at temperatures above or below 25° C. and has the same polarity. While this condition is not essential for proper compensation, it makes it easy to isolate the nonlinear error terms in a practical thermometer.

The compensation circuit may add an additional linear term to the output of the $\Delta V_{BE}$ generator 11, which requires the initial gain of the generator may be changed by about 5–10%.

FIG. 6 shows the curves associated with compensation circuit 45. Here the departure from linearity is exaggerated to show the effect. Actually at 150° C. the departure from a 1.5 volt output will be only a few tens of millivolts. Line 60 shows the ideal linear voltage response of a Celsius scale. As a practical matter, without any compensation, the voltage response will tend to follow curve 62. If the compensation of curve 61 is employed, the ideal will be closely approached. The dashed curve extensions show the performance of the compensation circuit below room temperature. $I_2$ will pull the value of $2V_B$ down so that the compensated curve will pass through zero at zero Celsius. In practice an accuracy of ±0.1° C. can be achieved using conventional IC components with on-chip trimming of resistors as described above. Since the compensation has no effect at 25° C. thereis no interaction of the adjustments and the simple two-step calibration needs to be done only once.

EXAMPLE

This circuit of FIG. 5 was constructed using conventional bipolar junction-isolated IC structures. The NPN transistors were of vertical construction and had Beta values on the order of 200 or better. The PNP transistors were of conventional high Beta lateral construction. The following component values were employed:

| Component | Value | Units |
|---|---|---|
| Resistor 27 | 5K | Ohms |
| Resistor 29 | *5K | Ohms |
| Resistor 30 | *40K | Ohms |
| Resistor 34 | 20K | Ohms |
| Resistor 35 | 20K | Ohms |
| Resistor 37 | 6.25K | Ohms |
| Resistor 38 | *136K | Ohms |
| Resistor 49 | 220K | Ohms |
| Resistor 50 | 4K | Ohms |
| Resistor 51 | 5K | Ohms |
| Source 54 | **10 | Microamps |
| Resistor 55 | 2.6K | Ohms |
| Resistor 56 | 5.2K | Ohms |
| Resistor 57 | 5.75K | Ohms⁻ |
| Resistor 58 | *60K | Ohms |

*on chip trimmable
**at 25° C. (the value rises linearily with absolute temperature)

The circuit operated from a $V_{CC}$ supply of 3.5 to 40 volts and drew a nominal current at 25° C. of about 50 microamperes. The output was calibrated for 10 mv/°C. and was accurate after trimming at wafer sort to ±0.1 degree over the range of 3° to 150° C.

It was found that below zero Celsius readings could be achieved by connecting a current sink to terminal 17 to act as a pull down circuit. A 100 microampere sink had little effect on above zero readings and would permit readings down to about −50° C.

The invention has been described and several embodiments detailed. When a person skilled in the art reads the foregoing description, alternatives and equivalents, within the spirit and intent of the invention, will become apparent. Accordingly, it is intended that the scope of the invention be limited only by the following claims.

I claim:

1. In an electronic thermometer circuit for producing a temperature related voltage that follows a predetermined temperature scale, said circuit comprising:
   means for developing a first voltage having a positive temperature coefficient, wherein said first voltage is developed as a function of the base-to-emitter potential difference between a pair of transistors conducting at different emitter current densities;

means for developing a second voltage having a negative temperature coefficient;

means for subtracting said second voltage from said first voltage;

an amplifier responsive to the difference between said first and said second voltages to provide an output voltage related to said difference; and means for adjusting one of said voltages whereby said amplifier output voltage is zero at the zero reference of said temperature scale, the improvement comprising:

means for obtaining second voltage by combining a plurality of series connected base to emitter voltages of conducting transistors and means for adjusting the gain of said amplifier to provide a desired scale factor whereby said amplifier gain is close to unity.

2. The improvement of claim 1 wherein said plurality of transistors is two and said amplifier gain is adjusted to about 1.119 whereby a scale factor of 10 mv/°C. is produced.

3. The improvement of claim 1 wherein said plurality of transistors is three and said amplifier gain is adjusted to about 1.253 whereby a scale factor of 10 mv/°F. is produced.

4. The improvement of claim 1 further comprising a compensation circuit for correcting the departure of said one of said first or second voltages from a linear response to temperature.

5. The improvement of claim 4 wherein said compensation circuit includes means for generating a current that varies in proportion to the square of absolute temperature.

6. A temperature compensation circuit for use within an integrated circuit chip wherein a compensation current is caused to vary as a function of the square of the chip absolute temperature, said circuit comprising:

a pair of output terminals between which said compensation current flows;

a source of input current which rises linearly with absolute temperature;

a first transistor having a base and having its emitter-collector circuit coupled between said pair of output terminals;

second and third transistors each having a base directly coupled to its collector and having their emitter-collector circuits cascade-connected in series to conduct said input current; and means for biasing said first transistor from the combined voltage drops across said second and third transistors whereby as said input current varies with temperature said current in said first transistor varies as the square of said temperature.

7. The circuit of claim 6 further comprising a fourth transistor having emitter, base, and collector, said fourth transistor being Darlington connected to said first transistor with its base being connected to receive said combined voltage drops across said second and third transistors.

8. The circuit of claim 7 further comprising means for making the current in said fourth transistor independent of temperature.

9. The circuit of claim 8 wherein said last recited means comprise: a fifth transistor having emitter, base, and collector, means for coupling its emitter base circuit in series with said fourth transistor emitter and a first biasing resistor;

a second biasing resistor coupled across the emitter-base circuit of said first transistor; and means for coupling the base of said fifth transistor to one of said second and third transistors for biasing therefrom whereby said fifth transistor develops a current that rises with increasing temperature and said second biasing resistor develops a current that falls with increasing temperature so that the current in said fourth transistor can be made substantially independent of temperature.

10. The circuit of claim 9 wherein each of said second and third transistors has a resistor coupled in series with its collector and has its base returned to the end of the resistor not connected to the collector.

* * * * *